(12) United States Patent
Pappachan et al.

(10) Patent No.: US 12,737,456 B2
(45) Date of Patent: Sep. 15, 2026

(54) SYSTEMS AND METHODS FOR SEQUENTIAL ANOMALY DETECTION IN IVNs USING A GRAPH-BASED STATE SPACE APPROACH

(71) Applicant: Robert Bosch GmbH, Stuttgart (DE)

(72) Inventors: Pradeep M. Pappachan, Pittsburgh, PA (US); Jorge Guajardo Merchan, Pittsburgh, PA (US)

(73) Assignee: Robert Bosch GmbH (DE)

( * ) Notice: Subject to any disclaimer, the term of this patent is extended or adjusted under 35 U.S.C. 154(b) by 192 days.

(21) Appl. No.: 18/367,771

(22) Filed: Sep. 13, 2023

(65) Prior Publication Data

US 2025/0086272 A1 Mar. 13, 2025

(51) Int. Cl.
*G06F 21/55* (2013.01)
*G06N 20/00* (2019.01)

(52) U.S. Cl.
CPC .......... *G06F 21/554* (2013.01); *G06N 20/00* (2019.01); *G06F 2221/034* (2013.01)

(58) Field of Classification Search
None
See application file for complete search history.

(56) References Cited

U.S. PATENT DOCUMENTS

2016/0225201 A1* 8/2016 Hiroki .................... H04L 67/12
2016/0291127 A1* 10/2016 Huang .................... G01S 5/10
2019/0312892 A1* 10/2019 Chung .................. G06F 21/554
2023/0054575 A1* 2/2023 Cohen .................. G06F 21/556
2024/0064160 A1* 2/2024 Zhang ................. H04L 41/0631
2024/0420566 A1* 12/2024 Kord ...................... H04W 4/44

OTHER PUBLICATIONS

A. Taylor, S. Leblanc and N. Japkowicz, "Anomaly detection in automobile control network data with long short-term memory networks," in IEEE Int. Conf. Data Sci. Advanced Anal. {DSAA), 2016.

(Continued)

*Primary Examiner* — Chris Parry
*Assistant Examiner* — Abderrahmen Chouat
(74) *Attorney, Agent, or Firm* — Dickinson Wright PLLC

(57) ABSTRACT

A method of operating an anomaly detection system includes receiving training message sequences corresponding to messages transmitted in an in-vehicle network (IVN), constructing, based on the training message sequences, a model that includes a plurality of states corresponding to observed signal values in the training message sequences and state transitions between respective states of the plurality of states, training the model by supplying, to the model, first messages sequences corresponding to the training message sequences and second message sequences not contained in the training message sequences, and, using the anomaly detection system, executing the model to identify anomalous message sequences transmitted in the IVN by receiving an IVN message sequence, outputting, from the model, a value based on state transitions between states of signals contained in the IVN message sequence, and outputting, based on the value, an indication of whether the IVN message sequence includes an anomalous message sequence.

14 Claims, 12 Drawing Sheets

(56) References Cited

OTHER PUBLICATIONS

K.-T. Cho and K. Shin, “Fingerprinting electronic control units for verhicle intrusion detection,” 2016.
M. L. Han, L. Jin, A. R. Kang, S. Kang, J. K. Park and H. K. Kim, “A Statistical-Based Anomaly Detection Method for Connected Cars,” in Internet of Vehicles—Safe and Intelligent Mobility, 2015, pp. 89-97.
M. Muter and N. Asaj, “Entropy-based anomaly detection for in-vehicle networks,” in IEEE Intell. Vehicles Symp. (IV), 2011.
S. N. Narayanan, S. Mittal and A. Joshi, “Using data analytics to detect anomalous states in vehicles,” 2015. [Online]. Available: https://arxiv.org/pdf/1512.08048.pdf.
W. Wu, R. Li, G. Xie, A. Jiyao, Y. Bai, J. Zhou and K. Li, “A survey of intrusion detection for in-vehicle networks,” IEE Transactions on Intelligent Transportation Systems, pp. 919-933, 2019.

* cited by examiner

310

320

Normal Message Sequence

| # | Signal | Source State (Throttle, Speed), Memory-2 | Target State (Throttle, Speed), Memory-2 | Distance Measure |
|---|---|---|---|---|
| 1 | Throttle= (5,10)(ECU1) | ((5,10),(25,30)) ((5,10),(25,30)) | ((5,10),(25,30)) ((5,10),(25,30)) | 0 |
| 2 | Speed= (30,35)(ECU2) | ((5,10),(25,30)) ((5,10),(25,30)) | ((5,10),(25,30)) ((5,10),(30,35)) | 0 |
| 3 | Throttle= (10,15)(ECU1) | ((5,10),(25,30)) ((5,10),(30,35)) | ((5,10),(30,35)) ((10,15),(30,35)) | 0 |
| 4 | Speed= (30,35)(ECU2) | ((5,10),(30,35)) ((10,15),(30,35)) | ((10,15),(30,35)) ((10,15),(30,35)) | 2 |
| 5 | Throttle= (15,20)(ECU1) | ((10,15),(30,35)) ((10,15),(30,35)) | ((10,15),(30,35)) ((15,20),(35,35)) | 1 |
| 6 | Speed= (35,40)(ECU2) | ((10,15),(30,35)) ((15,20),(30,35)) | ((15,20),(30,35)) ((15,20),(35,40)) | 0 |

Model Output = [0,0,0,2,1,0]

||[0,0,0,2,1,0]|| → Threshold Classifier → 0 (Normal)

324

Anomalous Message Sequence

× Invalid Transitions

| # | Signal | Source State (Throttle, Speed), Memory-2 | Target State (Throttle, Speed), Memory=2 | Distance Measure |
|---|---|---|---|---|
| 1 | Throttle= (5,10)(ECU1) | ((5,10),(25,30)) ((5,10),(25,30)) | ((5,10),(25,30)) ((5,10),(25,30)) | 0 |
| 2 | Speed= (30,35)(ECU2) | ((5,10),(25,30)) ((5,10),(25,30)) | ((5,10),(25,30)) ((5,10),(30,35)) | 0 |
| 3 | Speed= (40,45)(ECU3) | ((5,10),(25,30)) ((5,10),(30,35)) | ((5,10),(30,35)) ((10,15),(40,45)) × | 4 |
| 4 | Speed= (45,50)(ECU3) | ((5,10),(30,35)) ((10,15),(40,45)) × | ((10,15),(40,35)) ((10,15),(45,50)) × | 5 |
| 5 | Throttle= (10,15)(ECU1) | ((10,15),(40,35)) ((10,15),(45,50)) × | ((10,15),(45,50)) ((15,15),(45,50)) × | 5 |
| 6 | Speed= (30,35)(ECU2) | ((10,15),(45,50)) ((10,15),(45,50)) × | ((10,15),(45,50)) ((10,15),(30,35)) × | 3 |

Model Output = [0,0,4,5,5,6]

||[0,0,4,5,5,3]|| → Threshold Classifier → 1 (Anomaly)

FIG. 3C

SYSTEMS AND METHODS FOR SEQUENTIAL ANOMALY DETECTION IN IVNs USING A GRAPH-BASED STATE SPACE APPROACH

TECHNICAL FIELD

The present disclosure relates to detecting anomalies in In-Vehicle Networks (IVNs)

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Vehicles, such as cars, trucks, sport utility vehicles, crossovers, mini-vans, or other suitable vehicles include a propulsion system, a braking system, a steering system, and the like. Such vehicle systems may be manual controlled (e.g., by a vehicle operator) and/or autonomously or semi-autonomously controlled (e.g., by one or more autonomous or semi-autonomous vehicle controller). In some examples, autonomous or semi-autonomously vehicle controllers rely on or use various machine learning models for vehicle control decision making.

A controller area network (CAN) bus is the central communication network in several modern systems such as automotive systems, aerospace systems, industrial systems, etc. For example, electronic control units (ECUs) control multiple subsystems of vehicles and may communicate with each other over the CAN bus to ensure the proper functioning of one or more of these subsystems. Some nodes on the CAN bus, and more generally on the internal network of the vehicle, may be equipped with remote interfaces. Such interfaces may often be used to enable over-the-air updates, offer additional services, measure usage of applications, and measure usage of certain functions in electronic control units (ECUs) to enable maintenance services, etc.

SUMMARY

A method of operating an anomaly detection system includes receiving training message sequences corresponding to messages transmitted in an in-vehicle network (IVN), constructing, based on the training message sequences, a model that includes a plurality of states corresponding to observed signal values in the training message sequences and state transitions between respective states of the plurality of states, training the model by supplying, to the model, first messages sequences corresponding to the training message sequences and second message sequences not contained in the training message sequences, and, using the anomaly detection system, executing the model to identify anomalous message sequences transmitted in the IVN by receiving an IVN message sequence, outputting, from the model, a value based on state transitions between states of signals contained in the IVN message sequence, and outputting, based on the value, an indication of whether the IVN message sequence includes an anomalous message sequence.

In other features, the method further includes decoding the training message sequences and constructing the model based on the decoded training message sequences. Each of the plurality of states in the model corresponds to values of two or more correlated signals contained in the training message sequences. Each of the plurality of states includes at least two values for each of the two or more correlated signals. The model identifies probabilities of each of the state transitions between the respective states of the plurality of states. Outputting the value from the model includes one of calculating a distance between a first state of the plurality of states corresponding to a first message in the IVN message sequence and a second state corresponding to a second message in the IVN message sequence and calculating the value based on the distance, and calculating the value using a probability heuristic method. The distance corresponds to a number of state transitions in the model required to traverse between the first state and the second state. The second state does not correspond to any message contained in the training message sequences.

An anomaly detection system includes model constructor circuitry configured to receive training message sequences corresponding to messages transmitted in an in-vehicle network (IVN) and construct, based on the training message sequences, a model that includes a plurality of states corresponding to observed signal values in the training message sequences and state transitions between respective states of the plurality of states, sequence generator circuitry configured to train the model by supplying, to the model, first messages sequences corresponding to the training message sequences and second message sequences not contained in the training message sequences, model circuitry configured to execute the model to identify anomalous message sequences transmitted in the IVN by receiving an IVN message sequence and outputting, from the model, a value based on state transitions between states of signals contained in the IVN message sequence, and model output classifier circuitry configured to output, based on the value, an indication of whether the IVN message sequence includes an anomalous message sequence.

In other features, the anomaly detection system further includes a decoder configured to decode the training message sequences. The model constructor circuitry is configured to construct the model based on the decoded training message sequences. Each of the plurality of states in the model corresponds to values of two or more correlated signals contained in the training message sequences. Each of the plurality of states includes at least two values for each of the two or more correlated signals. The model circuitry is configured to implement the model to identify probabilities of each of the state transitions between the respective states of the plurality of states. The model circuitry is configured to implement the model to at least one of calculate a distance between a first state of the plurality of states corresponding to a first message in the IVN message sequence and a second state corresponding to a second message in the IVN message sequence, and calculate the value based on the distance, and calculate the value using a probability heuristic method. The distance corresponds to a number of state transitions in the model required to traverse between the first state and the second state. The second state does not correspond to any message contained in the training message sequences.

A computing device configured to implement an anomaly detection system for a vehicle includes a processing device configured to execute instructions stored in memory to cause the anomaly detection system to receive an in-vehicle network (IVN) message sequence corresponding to messages transmitted between electronic control units (ECUs) of the vehicle, provide the IVN message sequence to a model that includes a plurality of states corresponding to observed signal values in previous IVN message sequences and state transitions between respective states of the plurality of states, output, from the model, a value based on state transitions between states of signals contained in the IVN message sequence, and output, based on the value, an indication of whether the IVN message sequence includes an anomalous message sequence.

In other features, the processing device is further configured to execute instructions stored in memory to cause the anomaly detection system to decode the IVN message sequence and provide the decoded IVN message sequence to the model. Each of the plurality of states in the model corresponds to values of two or more correlated signals contained in the decoded IVN message sequence, each of the plurality of states includes at least two values for each of the two or more correlated signals, and the model identifies probabilities of each of the state transitions between the respective states of the plurality of states. The processing device is further configured to execute instructions stored in memory to cause the anomaly detection system to at least one of calculate a distance between a first state of the plurality of states corresponding to a first message in the IVN message sequence and a second state corresponding to a second message in the IVN message sequence, and calculate the value based on the distance, the distance corresponding to a number of state transitions in the model required to traverse between the first state and the second state, and calculate the value using a probability heuristic method.

BRIEF DESCRIPTION OF THE DRAWINGS

FIG. 3C are tables illustrating an example anomaly detection performed using distance measurements between previous (source) and next (target) states in a model for a normal message sequence and an anomalous message sequence according to the present disclosure.

In the drawings, reference numbers may be reused to identify similar and/or identical elements.

DETAILED DESCRIPTION

Figure 1:
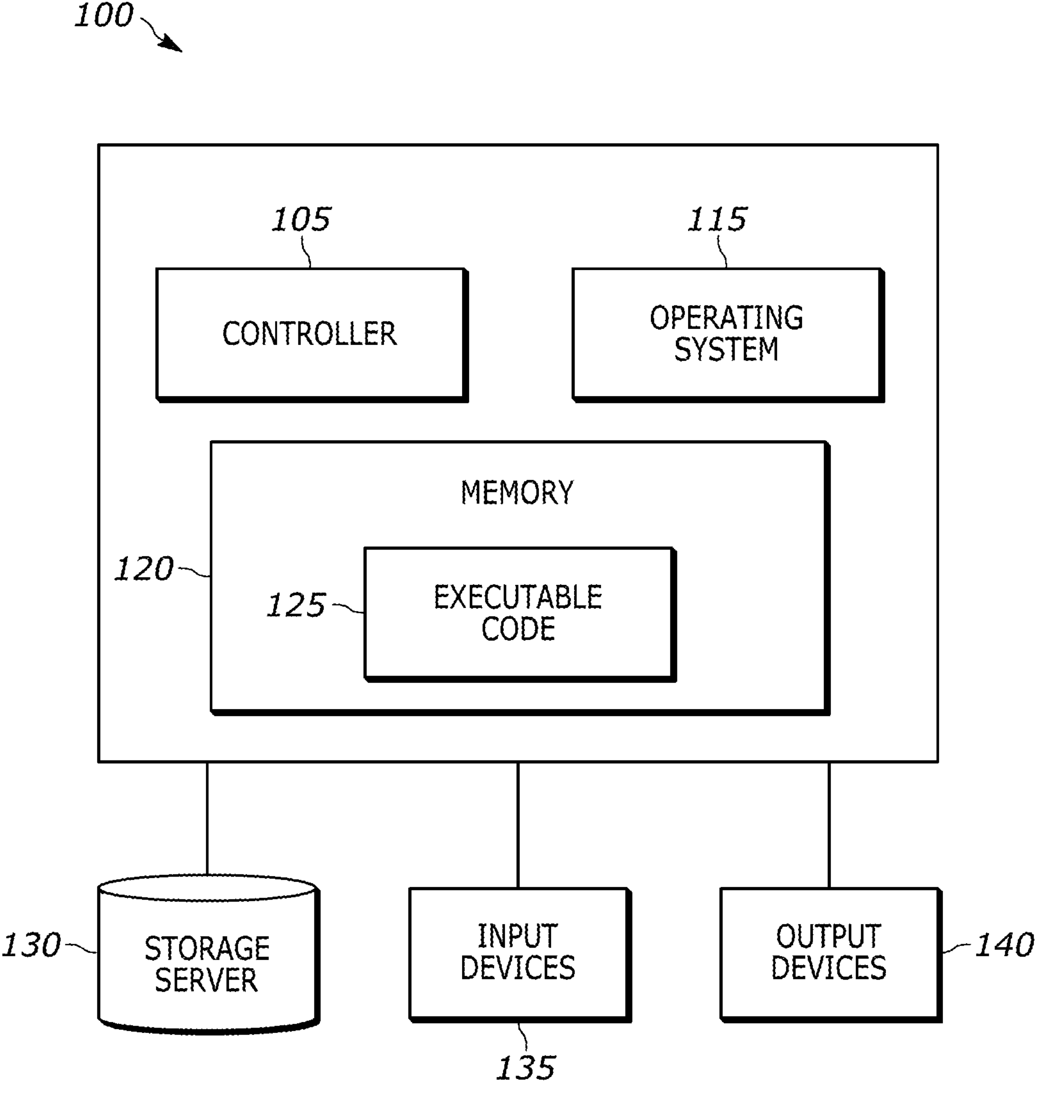
FIG. 1 is an example computing device according to the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle systems may be vulnerable to external attacks at multiple levels or layers, such as a physical layer (e.g., sensors, actuators, etc.), an In-Vehicle Network (IVN) layer, an application layer, etc. through various external network interfaces (e.g., cellular, Bluetooth, Wi-Fi, etc.). Automotive IVNs (e.g., controller area networks (CANs)) connect various electronic control units (ECUs) in a vehicle. ECUs broadcast messages over IVNs to communicate information about various system parameters, such as sensor values (e.g., engine speed, throttle position, etc.), to each other. IVNs may be vulnerable to malicious attacks/intrusions due to large numbers of Electrical Control Units (ECUs), the connectivity of the ECUs to external network, the increased reliance of ECUs on software, etc. An attacker can compromise an ECU through external interfaces, inject spurious signal values, prevent critical signals from being transmitted on the IVN, etc. Anomaly detection systems that operate based on IVN signals observe traffic on the network and attempt to distinguish normal traffic from anomalous traffic patterns that arise when one or more ECUs have been compromised.

Accordingly, detecting intrusions into networks is an integral part of automotive security to prevent or at least lower an impact of such intrusions. Various methodologies may be implemented to improve automotive security include, but are not limited to, firewalls, whitelisting, blacklisting of messages, and dedicated Intrusion Detection Systems (IDSs) implemented on one or more of the ECUs (e.g., on gateway ECUs). An IDS is a system that monitors predefined systems and/or networks and identifies intrusion attempts based on detection of suspicious, malicious, or undefined system behavior. Operation of the IDS relies on a prerequisite that the intrusion attempt is detectably different from regular system behavior.

As one example, the IDS may implement fingerprinting techniques and methods to compare unique electrical or other operating characteristics of an ECU to detected behavior. However, fingerprinting methods are not able to detect attacks at higher operation layers in automotive systems. As another example, entropy-based methods and methods that monitor parameters such as ECU message frequency may detect injection or denial-of-service (DOS) attacks may be ineffective against attacks whose signatures are unknown. As still another example, machine learning (ML)- and deep learning (DL)-based methods rely on training the system with a large number of examples of normal IVN traffic and flag deviations from normal patterns. The above methods may operate on raw IVN message data without consideration of message content. The methods also implement models that analyze individual ECU message streams. However, respective contexts of message streams simultaneously emitted by other ECUs may not be available for an analysis that can use inter-signal correlation effects to detect anomalous behaviors.

Anomaly detection systems and methods according to the present disclosure are configured to detect attacks at the IVN layer such as frame injection, frame modification, frame modification, frame deletion, and DoS attacks that are cause by one or more ECUs being compromised and used as staging points for such attacks. For example, an anomaly detection system implements a state space representation of the IVN based on ECU signals and one or more heuristic methods to distinguish between normal and anomalous IVN traffic. While other methods based on ML/DL techniques and Hidden Markov models work on raw (i.e., encoded) IVN signals/messages from single ECUs and opaque system states, the anomaly detection system of the present disclosure operates on actual (i.e., decoded) signal content of the IVN messages from multiple ECUs based on correlations between the signals. Using the state space model and heuristics, the anomaly detection system significantly reduces the occurrence of false positives while maintaining high accuracy (i.e., detection of true positives).

Accordingly, the anomaly detection system is configured to access decoded IVN messages (e.g., by using a vendor-provided database (DBC file) for CAN messages) in real time. The anomaly detections system may include and/or implement, inter alia, the state space model, a set of heuristic methods, and a classifier (e.g., implemented or executed by circuitry such as one or more processing devices or processors). The state space model may be based on a signal-based state space (e.g., represented in a graph data structure) generated using a training set of IVN message sequences. Using the state space model and the set of heuristic methods, state transitions induced by ECU signals emitted during the operation of the vehicle may be scored. In other words, transitions between states of the model are scored with state transition scores. The state transition scores are indicative of whether the sequences of IVN messages are normal or anomalous. The state space model is configured to use measurements calculated by the heuristic methods to better discriminate between truly anomalous sequences and sequences that may not been observed during the construction of the model but are nonetheless "normal." Accordingly, the false positive rate is improved (i.e., decreased) while high accuracy is preserved. Examples of heuristic methods include, but are not limited to, (i) a distance measure that calculates a "distance" between two states in a state transition and (ii) probability bounds on a change in the signal value or the rate of change of the signal value associated with a state transition.

The classifier in the anomaly detection system is configured to classify sequences of IVN messages (e.g., of a fixed length) as normal or anomalous. The classifier may trained with a set of scores (e.g., output by the state space model and the various heuristic methods) associated with the message sequences (e.g., in the training set), along with classification labels (e.g., ground truth labels) for the message sequences. Various ML or DL methods may be used to build the classifier, such as a support vector machine (SVM), random forests, neural networks, etc.

Accordingly, the anomaly detection systems and methods according to the present disclosure implement a state space representation of a system of ECUs, modeled as a graph, based on observable signals transmitted by the ECUs on the IVN. The use of correlated signals and incorporation of memory of recent signals in the state space model provide more context for anomaly detection, and the use of various heuristics, along with the state space model, to output scores for signal sequences, enable the classifier to better discriminate between normal and anomalous sequences. The model can be updated/improved by learning incrementally (e.g., via online learning) from new data, which is more efficient compared to training models that use ML/DL methods that have to be retrained when new data becomes available. Classification tasks of these systems and methods are more efficient relative to ML or DL methods that require expensive hardware acceleration to meet real-time constraints. Further, as compared to various methods such as DL and Hidden Markov models, the graph-based described herein model facilitates representation of anomaly predictions for analysis.

FIG. 1 shows a block diagram of an example computing device 100 and related circuitry configured to implement the anomaly detection systems and methods according to some embodiments of the present disclosure. The computing device 100 may include a controller 105 that may be, for example, a central processing unit processor (CPU), a chip, or any suitable computing or computational device, an operating system 115, a memory 120, executable code 125, a storage server system 130, input devices 135, and output devices 140. The controller 105 (or one or more controllers or processors, possibly across multiple units or devices) may be configured to carry out methods described herein, and/or to execute or act as the various modules, units, etc. More than one of the computing devices 100 may be included in, and one or more of the computing devices 100 may act as the components of, a system according to embodiments of the disclosure.

The operating system 115 may be or may include any code segment (e.g., one similar to the executable code 125 described herein) designed and/or configured to perform tasks involving coordination, scheduling, arbitration, supervising, controlling or otherwise managing operation of the computing device 100, for example, scheduling execution of software programs or tasks or enabling software programs or other hardware modules or units to communicate. The operating system 115 may be a commercial operating system. It will be noted the operating system 115 may be an optional component, e.g., in some embodiments, a system may include a computing device that does not require or include the operating system 115. For example, a computer system may be, or may include, a microcontroller, an application specific circuit (ASIC), a field programmable array (FPGA), network controller (e.g., CAN bus controller), associated transceiver, system on a chip (SOC), and/or any combination thereof that may be used without an operating system.

The memory 120 may be or may include, for example, Random Access Memory (RAM), read only memory (ROM), Dynamic RAM (DRAM), Synchronous DRAM (SD-RAM), a double data rate (DDR) memory chip, Flash memory, volatile memory, non-volatile memory, cache memory, a buffer, a short term memory unit, a long term memory unit, or other suitable memory units or storage units. The memory 120 may be or may include a plurality of, possibly different memory units. The memory 120 may be a computer or processor non-transitory readable medium, or a computer non-transitory storage medium, e.g., RAM.

The executable code 125 may be any executable code, e.g., an application, a program, a process, task or script. The executable code 125 may be executed by the controller 105 possibly under control of the operating system 115. For example, the executable code 125 may be an application that enforces security in a vehicle as further described herein and, for example, detects or prevents cyber-attacks on in-vehicle networks. Although, for the sake of clarity, a single item of the executable code 125 is shown in FIG. 1, a system according to some embodiments of the disclosure may include a plurality of executable code segments similar to the executable code 125 that may be loaded into the memory 120 and cause the controller 105 to carry out methods described herein. Where applicable, the terms "process" and "executable code" may mean the same thing and may be used interchangeably herein. For example, verification, validation and/or authentication of a process may mean verification, validation and/or authentication of executable code.

The storage system 130 may be or may include, for example, flash memory as known in the art, memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in the storage system 130 and may be loaded from the storage system 130 into the memory 120 where it may be processed by the controller 105. In some embodiments, some of the components shown in FIG. 1 may be omitted. For example, the memory 120 may be a non-volatile memory having the storage capacity of the storage system 130. Accordingly, although shown as a separate component, the storage system 130 may be embedded or included in the memory 120.

The input devices 135 may be or may include any suitable input devices, components or systems, e.g., physical sensors such as accelerometers, tachometers, thermometers, microphones, analog to digital converters, etc., a detachable keyboard or keypad, a mouse and the like. The output devices 140 may include one or more (possibly detachable) displays or monitors, motors, servo motors, speakers and/or any other suitable output devices. Any applicable input/output (I/O) devices may be connected to the computing device 100 as shown by blocks 135 and 140. For example, a wired or wireless network interface card (NIC), a universal serial bus (USB) device, JTAG interface, or external hard drive may be included in the input devices 135 and/or the output devices 140. It will be recognized that any suitable number of the input devices 135 and the output devices 140 may be operatively connected to the computing device 100 as shown by blocks 135 and 140. For example, the input devices 135 and the output devices 140 may be used by a technician or engineer in order to connect to the computing device 100, update software, and the like. Input and/or output devices or components 135 and 140 may be adapted to interface or communicate, with control or other units in a vehicle, e.g., input and/or output devices or components 135 and 140 may include ports that enable the computing device 100 to communicate with an engine control unit or module, a suspension control unit or module, a traction control unit or module, and the like.

Embodiments may include an article such as a computer or processor non-transitory readable medium, or a computer or processor non-transitory storage medium, such as for example memory, a disk drive, or USB flash memory, encoding, including or storing instructions (e.g., computer-executable instructions, which, when executed by a processor or controller, carry out methods disclosed herein), a storage medium such as the memory 120, computer-executable instructions such as the executable code 125, and a controller such as the controller 105.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the disclosure may include components such as, but not limited to, a plurality of central processing units (CPU) or any other suitable multi-purpose or specific processors or controllers (e.g., controllers similar to the controller 105), a plurality of input units, a plurality of output units, a plurality of memory units, and a plurality of storage units, etc. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments, a system may include or may be, for example, a plurality of circuitry components that include a respective plurality of central processing units, e.g., a plurality of CPUs as described, a plurality of CPUs embedded in an on board, or in-vehicle, system or network, a plurality of chips, FPGAs or SOCs, microprocessors, transceivers, microcontrollers, a plurality of computer or network devices, any other suitable computing device, and/or any combination thereof. For example, a system as described herein may include one or more devices such as the computing device 100.

Figure 2:
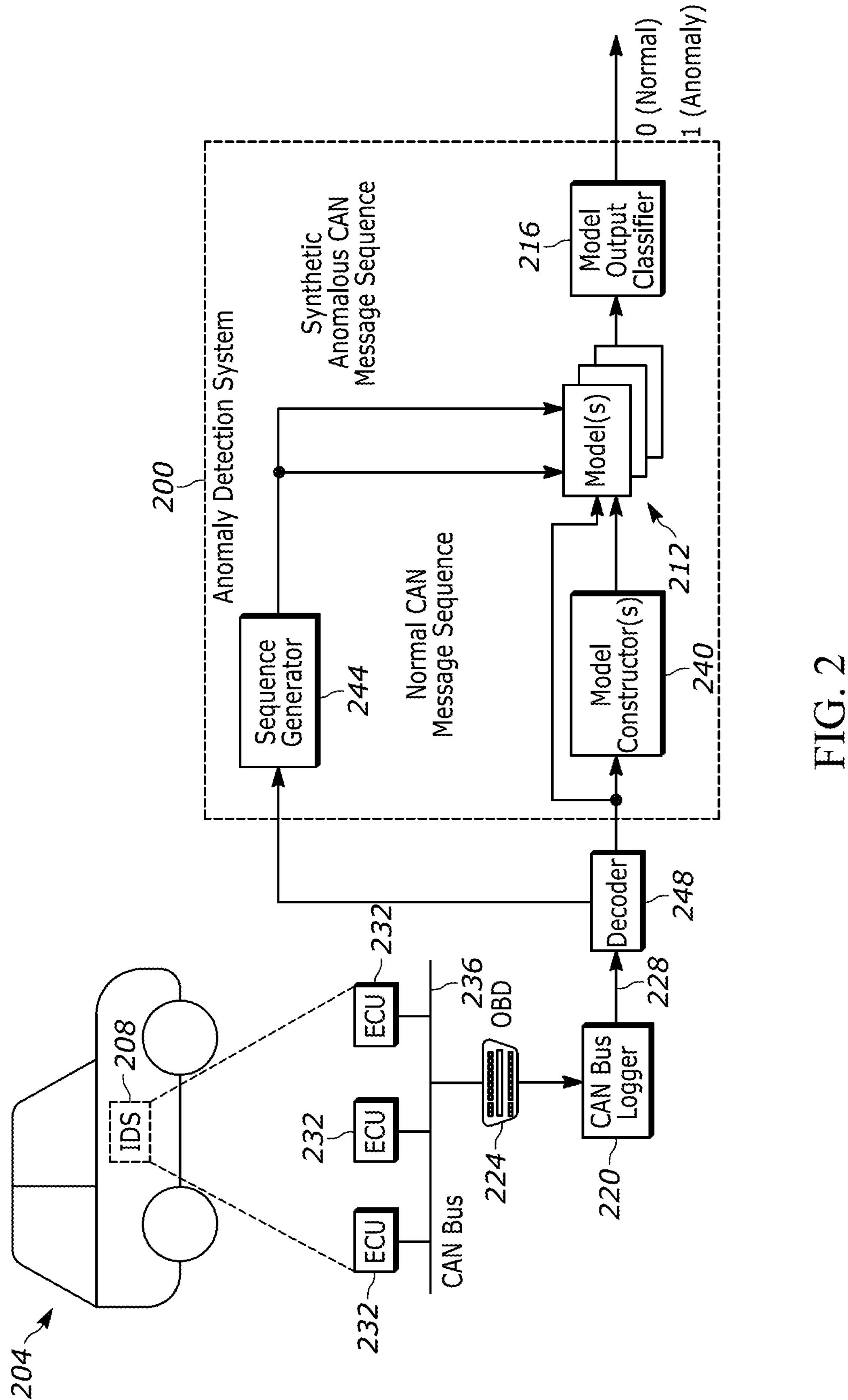
FIG. 2 is an example anomaly detection system according to the present disclosure.

FIG. 2 shows an embodiment of an anomaly detection system 200 and a vehicle 204 may implement an IDS 208 according to the present disclosure. Portions of the IDS 208 are implemented within the vehicle 204 while other portions of the IDS 208 may be implemented on one more remote servers (which may be implemented within a cloud computing system or cloud backend, a Vehicle Security Operations Center (VSOC), etc.). The anomaly detection system 200 according to the present disclosure may include and/or be implemented using circuitry such as a computing device, one or more processing devices, etc. as described above and elsewhere herein. For example, the anomaly detection system 200 includes circuitry configured to store and/or implement one or more state space models (model 212) and further includes a model output classifier 216 configured to classify outputs of the model 212 as normal or anomalous as described below in more detail. For example only, the model output classifier 216 may be implemented using classifier circuitry, such as a computing device, a processing device configured to executed instructions to classify outputs of the model 212, etc.

In some example implementations, a device such as a CAN bus logger 220 may communicate with vehicle systems via an onboard diagnostic port 224 (e.g., an OBD-II Port) of the vehicle 204 and record and/or output CAN messages (e.g., IVN signals provided as traces 228), including security- and vehicle control-related CAN messages. For example, the device communicates with one or more ECUs 232 of the vehicle 204 via a CAN bus 236. One or more of the ECUs 232 may correspond to a gateway ECU. The stored CAN messages are available for visualization and further processing and may be accessible for external services, such as model construction and training performed using the anomaly detection system 200. For example, the traces 228 may be provided to one or more model constructors 240 configured to construct the models 224 based on data contained in the traces 228 as described below in more detail. As one example, the model constructor 224 may be implemented using circuitry of a computing devices, such as any computing device described herein.

The traces 228 may be further provided to a sequence generator 240. The sequence generator 240 (e.g., sequence generator circuitry, such as circuitry implemented by a computing device, processing device, etc. and configured to generate/output CAN message sequences) provides CAN message sequences to the models 224. For example, the sequence generator 240 supplies (e.g., passes through without modification) a normal CAN message sequence constructed based on the traces 228 and generates a synthetic anomalous CAN message sequence. In other words, the normal CAN message sequence corresponds to actual CAN message sequences observed on the CAN bus 236 and recorded by the CAN bus logger 220. Conversely, the synthetic anomalous CAN message sequence is generated by the sequence generator 240. For example, the synthetic anomalous CAN message sequence includes message sequences that are not observed on the CAN bus 236 but may occur during operation (e.g., such as subsequent to an intrusion into the IVN. The sequence generator 240 may implement one or more algorithms that modify the normal CAN message sequences to simulate the effects of various known attacks on IVNs. In other words, the synthetic anomalous CAN message sequence represents possible normal CAN bus behavior that the anomaly detection system 200, components of the IDS 208, etc. have, nonetheless, not seen or observed during normal operation.

In this manner, the model 212 are constructed and trained to differentiate between (i) new or not yet seen "normal" CAN message sequences that do not correspond to an attack or intrusion and (ii) CAN message sequences that correspond to an attack or intrusion. As one example, the model 212 are constructed based on unmodified traces (e.g., the traces 228) provided to the model constructor 240 and then trained based on both the normal CAN message sequences and the synthetic anomalous CAN message sequences received from the sequence generator 244. The normal CAN message sequences functions as training sequences that are used to identify states (nodes) and transitions (edges) between the states that comprise the graph-based state space model described below. Subsequent to the model being built from the training sequences, the model output classifier 216 is trained to distinguish between normal and anomalous sequences based on the output of the model. Once the model 212 and the model output classifier 216 are trained, a test set of sequences can be passed through the model 212 and the model output classifier 216 to determine precision and recall metrics of the anomaly detection system 200.

Typically, IVN signals/messages communicated on the CAN bus 236 are encoded. Accordingly, the anomaly detection system 200 according to the present disclosure communicates with (or, in some examples, includes) a decoder or decoder circuitry 248 configured to decode the IVN signals/messages (e.g., using a CAN database (DBC) file). The decoder 248 provides, as the traces 228, the actual (i.e., decoded) signal content of the IVN messages from the multiple ECUs 232 to the relevant components of the anomaly detection system 200. For example, the sequence generator 244 generates shorter sequences of the decoded IVN signals (e.g., sequences having a predetermined or adjustable length) using longer sequences of decoded IVN signals received from the decoder 248. The decoded IVN messages indicate actual signal values (e.g., commanded or control signals, sensed or measured values, etc.) communicated by the ECUs 232 and may include strings or sequences of signal values each with a corresponding timestamp. Accordingly, correlations between the actual signal values may be observed by the model constructor 240 and other components of the anomaly detection system 200.

Typically, the ECUs 232 are connected to various sensors and actuators and broadcast signals on the network (e.g., the CAN bus 236). These signals can have continuous domains within some intervals (e.g., engine speed, throttle position, vehicle speed, etc.) or have discrete values (e.g., transmission gear position (neutral, reverse, $1^{st}$, $2^{nd}$, $3^{rd}$, $4^{th}$, $5^{th}$, etc.), brake pedal status (pressed, not pressed, etc.). The values of each type of signal on the network may correspond to a time series. The time series can be examined and analyzed in isolation or together to detect anomalies (i.e., deviations from normal patterns). The state space-based model of the present disclosure is configured to evaluate characteristics of IVN signals to better predict anomalies as described below in more detail.

As one example, certain signals such as vehicle speed and throttle signals (e.g., a measured vehicle speed and a commanded or sensed throttle position) may be directly or indirectly correlated since throttle position controls speed. However, encoded signals corresponding to vehicle speed and throttle as communicated on the CAN bus 236 may not have any correlation. Since the IVN messages according to the present disclosure are decoded, detection of anomalous behavior by the anomaly detection system 200 is facilitated. For example, if decoded IVN messages corresponding to two correlated signals do not correlate as expected (e.g., vehicle speed is increasing while throttle position is decreasing), the anomaly detections system 200 may determine that spurious signal values are being injected into the system. More specifically, the model 212 are constructed in part based on expected correlations between IVN signals.

As another example, a recent history of signal along with correlations to other signal values can provide the anomaly detection system 200 with additional context for processing message sequences. For example, if the most recent values of a vehicle speed signal were increasing along with corresponding values of an accelerator pedal position signal, future values of the vehicle speed signal may be expected to continue increasing as the vehicle accelerates. A deviation from this pattern (e.g., vehicle speed decreasing as acceleration increases) may indicate an anomaly. Accordingly, the anomaly detection system 200 of the present disclosure incorporates "memory" of recent signal values into states of the state space-based model. Each state encodes not only the most recently observed values of signals but also values from a recent history of the signals to facilitate identification of signal patterns.

Figure 3A:
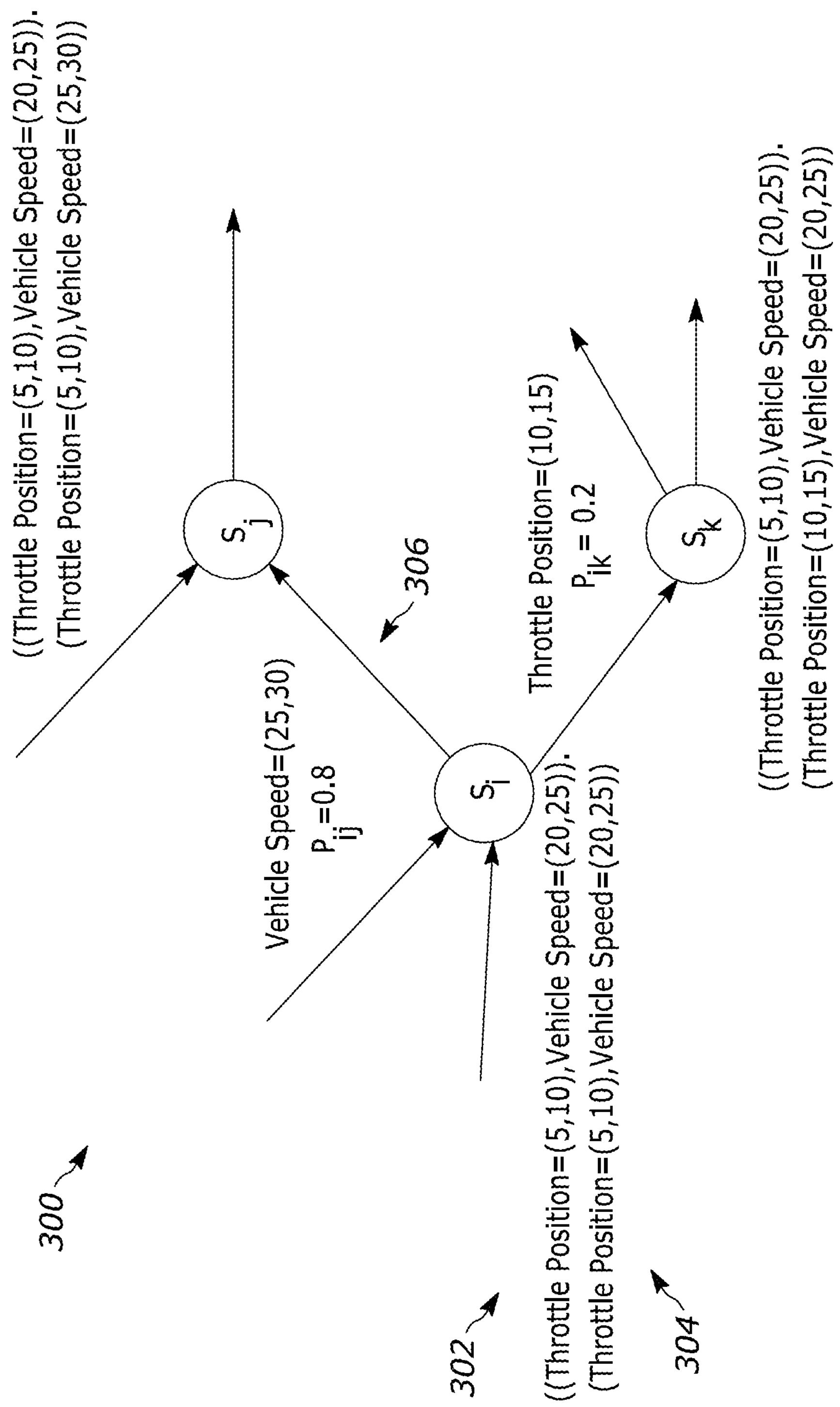
FIG. 3A is an example state space-based model implemented by an anomaly detection system according to the present disclosure.

FIG. 3A shows an example signal-, graph-, and state space-based model 300 implemented by the anomaly detection system 200 according to the present disclosure. The model 300 is represented as a graph G=(V, E), where V, a set of nodes in the graph, represents states of the system, and E, a set of directed edges, represent transitions between the states. Each state S, corresponding to a node in the graph, encodes the values of signals from a set of correlated signals (e.g., as signal snapshots). A signal snapshot is an n-tuple of signal values. Each signal snapshot indicates signal values that characterize the state of the system at an instant in time. Each state may incorporate more than one signal snapshot. For example, a set of signal snapshots in a state encodes the most recent signal values (e.g., in chronological order).

For example only, the model 300 as shown corresponds to a system having only two signals: ThrottlePosition and VehicleSpeed. Since these signals have continuous domains, the values can be discretized into domains according to associated criteria. In this example, the domains are subdivided into intervals of a length of five units. Each state encodes two signal snapshots. For example, state $S_i$ has two signal snapshots: ((ThrottlePosition=(5,10), VehicleSpeed=(20,25)) and (ThrottlePosition=(5,10), VehicleSpeed=(20, 25)). Each signal snapshot incorporates values of the two signals at an instant in time. As shown in FIG. 3A, a most recent signal snapshot for each of the states is listed on top (e.g., as shown at 302) while the previous snapshot is listed on bottom (e.g., as shown at 304). Together, the two signal snapshots represent a memory capacity of two for each state in the model 300.

Edges (i.e., transitions) between the states represent state transitions induced by observations of a signal on the IVN. For example, an edge 306 between states $S_i$ and $S_j$ represents a transition induced by a signal value of (25,30) for VehicleSpeed being observed on the network. This transition causes the system to transition to $S_j$, where a most recent signal snapshot (ThrottlePosition=(5,10), VehicleSpeed=(25,30)) reflects a change in VehicleSpeed from the previous signal snapshot. The most recent signal snapshot in state $S_i$ becomes the previous (older) signal snapshot in state $S_j$.

Further, a transition probability is assigned to each edge/transition. For example, a transition probability $p_{ij}$ is assigned to the edge 306 connecting the states $S_i$ and $S_j$. The transition probabilities may be empirically estimated from the traces 228. For example only, the transition probability associated with the transition from $S_i$ to $S_j$ is $p_{ij}$=0.8. In other words, out of all the outbound transitions from $S_i$, 80% of the transitions corresponded to transitions from $S_i$ to $S_j$ (e.g., and the remaining 20% corresponded to transitions from $S_i$ to $S_k$). Accordingly, each transition probability assigned to an each corresponds a probability of a transition between the two states. In this manner, the model 300 is constructed (e.g., by the model constructor 240, responsive to decoded IVN signals received from the decoder 248) based on actual observed (i.e., "normal") behavior on the CAN bus 236.

For example, as CAN message sequences are received, corresponding states (e.g., each corresponding to two signal snapshots of correlated signals) are added to the model 300. Similarly, as signals transition between states, edges/transitions between the states are added to the model 300. All transitions between states are counted over time to calculate respective probabilities of transitions between any two of the states. Accordingly, as the CAN message sequences are received, the model constructor 240 (i) adds states to the model 300, (ii) adds transitions between states to the model 300, and (iii) counts and updates transitions between states of the model 300 to calculate the transition probabilities for each transition.

Figure 3B:
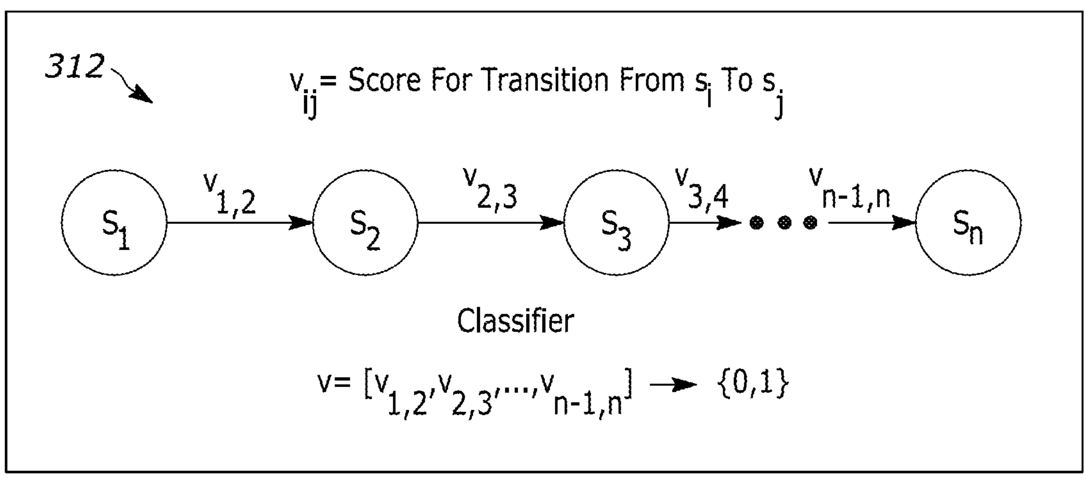
FIG. 3B is an example classification process configured to classify IVN signal sequences based on an output of a model according to the present disclosure.

FIG. 3B shows an example classification process 310 (e.g., implemented by the model output classifier 216) configured to classify IVN signal sequences based on an output 312 of the model 212/300. For example, the output 312 of the model 300 includes values based on the assigned transition probabilities for transitions between various states for one or more signals as described above. The model output classifier 216 analyzes sequences of messages to predict whether the sequences are normal or anomalous (i.e., include anomalies indicative of attacks or intrusion attempts). For example, each signal input to the model 300 (e.g., from the sequence generator 244) may correspond to a state transition. Some of the state transitions may already exist in the model 300 (i.e., were already observed by the model constructor 240) while others may not be included in the model 300 because, for example, (i) the training data used to construct the model 300 did not include the missing state transition or (ii) the state transition is illegal and potentially an anomaly.

As shown in FIG. 3B, the output 312 of the model 300 associates a value v with each state transition associated with a sequence of input signals. The output 312 represents n state transitions associated with n signals observed on the IVN. The transition from each state $S_i$ to a corresponding next or successor state $S_j$ is associated with a value $v_{ij}$. Accordingly, the output 312 of the model 300 for the sequence is a vector of the values associated with the state transitions. The model output classifier 216 receives the vector of values for the state transitions and outputs 0 in response to a determination that the values correspond to a normal message sequence and outputs a 1 in response to a determination that the values correspond to an anomalous message sequence. Various types of classification techniques may be implemented by the model output classifier, including, but not limited to, a threshold classifier, an ML classifier (e.g., implementing a Support Vector Machine (SVM) algorithm, a random forest algorithm, etc.), and a DL classifier based on neural networks.

Various methods may be used to assign values to (i.e., score) the state transitions, including various heuristic methods. As one example, each value associated with a state transition may correspond to the transition probability associated with the corresponding edge in the model 300. As another example, each value associated with a state transition may be a measure of the distance of a next state from a previous state in a transition. For example, if the previous state and the next state form an edge in the model 300 (i.e., are directly connected by an edge/transition), the distance is 1. Conversely, if the previous state and the next state are not directly connected, the distance is greater than 1 (e.g., as estimated using heuristic or other methods, described below in more detail). As still another example, each value associated with a state transition may be a measure of a probability of observing a specific signal change associated with the state transition (e.g., a probability that the specific transition could have occurred).

FIG. 3C illustrates example anomaly detection performed using distance measurements between previous (source) and next (target) states in the model 300 for a normal message sequence (in a first table 320) and an anomalous message sequence (in a second table 324). In this example, two signals are considered: ThrottlePosition (e.g., received from a first ECU (ECU1) of the ECUs 232) and VehicleSpeed (e.g., received from a second ECU (ECU2) of the ECUs 232). Each state of a corresponding model (such as model similar to the model 300) encodes the two most recent signal snapshots containing signal values for the two signals. In the tables 320, 324, a signal column contains a most recent signal value of each signal, and a source state column and a target state column respectively contain a source (previous) state and a target (next) state associated with a transition induced by the signal value in signal column. A distance measure column contains a distance measure or value associated with the state transition (e.g., a distance heuristic measure). Accordingly, each row illustrates a transition (e.g., labeled 1-6) from a source state to a target state.

The first table 320 represents signal values and transitions of a normal message sequence. For example, the transitions 1 2, 3, and 6 may correspond to transitions included in the model (i.e., directly correspond to known, previously observed transitions between states in the model) and therefore may have a distance measure of 0 (i.e., "normal"). Conversely, transitions 4 and 5 have non-zero values associated with them. For example, transitions 4 and 5 may not have been previously observed and added to the model (e.g., in response to training sequences) but may not necessarily be indicative of an anomaly. Rather, the relatively low distance values (2 and 1, respectively, for the transitions 2 and 1) may instead indicate that the transitions correspond to not previously seen but nonetheless normal behavior. For example, the output of the model for the message sequence corresponding to the transitions 1-6 of the first table 320 is a vector [0, 0, 0, 2, 1, 0]. As one example, a classification method implemented by the model output classifier 216 (e.g., a threshold classifier) may be configured to compare an L2 or Euclidean norm or other calculated value (e.g., an average distance measure of the transitions) of the vector to a predetermined threshold (e.g., a threshold selected while training/constructing the model output classifier 216). If the calculated value of the vector is less than (or, in some examples, less than or equal to) the predetermined threshold, the message sequence may be classified as normal (e.g., assigned a value of 0).

Conversely, the second table 324 is an example representation of an anomalous message sequence. In this example, a third ECU (ECU3) of the ECUs 232 represents an ECU that was compromised and used to spoof signal values of the VehicleSpeed (i.e., transmit VehicleSpeed values as if the values originated from ECU2). For example, the transitions illustrated in rows 3 and 4 may include spurious values injected by ECU3. Accordingly, in response to receiving the message sequence shown in the second table 324, the model outputs a vector [0, 0, 4, 5, 5, 6] having greater distance measures corresponding to the transitions 3, 4, 5, and 6. In other words, the distance measures associated with the state transitions resulting from the spurious signals injected by ECU3 have greater values. Therefore, the model output classifier 216 (e.g., implemented the same threshold classifier described above) predicts that the message sequence is anomalous. For example, the calculated value of the vector (e.g., the L2 or Euclidean norm) is greater than the predetermined threshold.

In this manner, anomaly detection system 200 implements a model configured to output vectors that can be identified (e.g., using the model output classifier 216) as either normal or anomalous.

The anomaly detection system 200 may implement various heuristic techniques or methods to distinguish between normal and anomalous message sequences, such as a distance heuristic method (as described above) or a signal change probability heuristic method. The heuristic methods are configured to associate higher scores (e.g., values of the vectors output by the model) with state transitions that are not incorporated into the model. In this manner, the model output classifier 216 is better able to distinguish between normal and anomalous message sequences, leading to lower incidence of false positives and improved accuracy during classification.

Figure 3D:
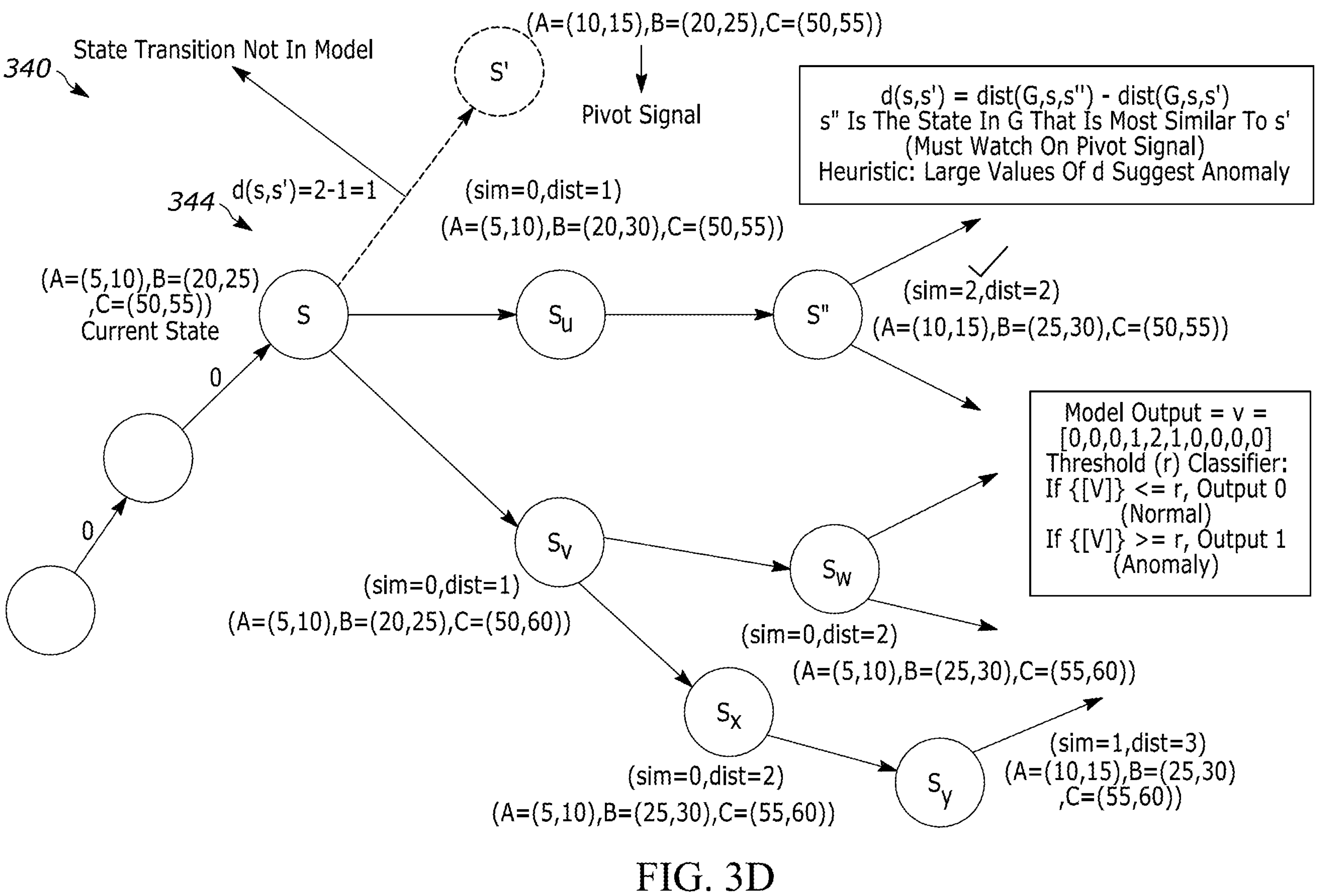
FIG. 3D illustrates an example distance heuristic method as applied to a portion of a model according to the present disclosure.

FIG. 3D illustrates an example distance heuristic method as applied to a portion of a model 340. In this example, A, B, and C correspond to signals received in each signal snapshot. A most recent state transition is shown between states S and S'. An edge 344 between the states S and S' is shown with a dashed line to indicate that the edge 344 does not correspond to an edge added during training of the model 340 (i.e., from training messages/training message sequences). Accordingly, the anomaly detection system 300 analyzes the edge 344 to determine whether the corresponding message sequence is normal (but not observed during training) or anomalous.

To assign a value to state transition corresponding to the edge 344, a breadth first search (BFS) traversal of nodes (i.e., states) in the model 340 (e.g., starting from state S and up to a predetermined or fixed distance) is performed. During the BFS traversal, a state in the model 340 that is most similar to the state S' among the nodes is identified (e.g., according to a defined similarity measure such as described below in more detail). For example, any states that are candidates for being a most similar state to the state S' must agree in a pivot signal value, such as the signal value that caused the state transition from S to S' (e.g., as shown a value of A=(10,15) for the signal A). When the most similar state is identified (e.g., S"), a first distance from the state S to the state S" in the model 340 is calculated and a second distance from S to S' is subtracted from the first distance. The difference between the first distance and the second distance corresponds to an "extra" distance that must be travelled to transition from the state S to reach a state S" that is most similar to the latest observed state S'. For example, a greater extra distance may be assumed to be more likely to correspond to an anomalous message sequence. In other words, an extra distance value of 0 corresponds to transitions between states already observed and contained within the model 340 while distances of 1 or greater correspond to transitions to a next state that was not previously observed. The model output classifier 216 is trained with the vectors output from the model 340 for multiple normal and anomalous message sequences to learn to distinguish between the normal and anomalous message sequences based on distance measure values.

As shown in FIG. 3D, of all the states encountered during the BFS traversal from the state S, the state S" is determined to be the state most similar to S'. Only one other state ($S_y$), agrees with respect to the pivot signal A. However, according to a similarity measure described below in more detail), the state S" has a higher similarity score of sim=2 (since S" also agrees with respect to signal C) relative to the state $S_y$, which has a similarity score of sim=1. Therefore, the distance measure (d) associated with the transition from S to S' is given by a distance from S to S" minus a distance from S to S' (i.e., d(S,S')=dist(G, S, S")−dist(G, S, S')=2−1=1). Conversely, if instead of the state S' the next state after S is $S_u$, the distance measure associated with the transition would be $d(S, S_u)=dist(G, S, S_u)-dist(G, S, S_u)=0$.

Similarity (e.g., a similarity score) between two states may be determined using various methods. For two states $S_i$ and $S_j$ that encode signal snapshots $(S_{i1}, S_{i2}, \ldots)$ and $(S_{j1}, S_{j2}, \ldots)$, respectively, variables $s_{mn}$ in the signal snapshots represent an $n^{th}$ signal value in the mth signal snapshot. As one example, a similarity score between $S_i$ and $S_j$ can be calculated using an L1 or Manhattan norm of the vector $(s_{i1}-s_{j1}, s_{i2}-s_{j2}, \ldots)$. For example, smaller L1 norms may correspond to states with signal values (e.g., scaled signal values as captured in respective signal snapshots) that are similar to each other.

In an example, each iteration of a BFS traversal returns a next node of the model 340 starting from a node corresponding to the previous state. The BFS traversal may be limited by a fixed search distance (e.g., 3 nodes ahead, 4 nodes ahead, etc.). If the search distance is exceeded, the BFS traversal does not return a valid state (e.g., returns a NIL value). The pivot signal used for the BFS traversal is the most recent signal seen in the received message sequence (i.e., the signal value that caused the state transition). During each iteration, the state corresponding to next node in the BFS traversal is extracted and a similarity score of that state relative to the next state is determined. If the score exceeds the previous highest similarity score, the corresponding distance measure is updated. After all the nodes within the permitted search distance have been processed and evaluated for respective similarity scores and distance measures, a value of the distance measure corresponding to the state having the highest similarity score is selected. If no similar node is found within the search distance of the BFS traversal, the transition may be assigned a large constant value (e.g., a distance value of 10 or greater). Using the distance heuristic algorithm described above, each state transition associated with a signal value in a message sequence can be associated with a score and the resulting output vector for the entire signal sequence can then be input to the model output classifier 216.

In another example, the anomaly detection system implements a signal change probability heuristic method configured to evaluate a change in the signal value that caused the transition. Using the training samples, a mean ($\mu$) and a variance ($\sigma^2$) of the distribution of the difference between two successive values of a signal can be calculated. For a random variable X that represents the change in the value of a signal in a sequence, a value k corresponds to a difference between X and the mean $\mu$. From Chebyshev's inequality, a probabilistic inequality can be defined as $P\{|X-\mu|\geq k\}\leq\sigma^2/k^2$. The value $\sigma^2/k^2$ represents an upper bound on a probability that the actual signal value change can deviate from the mean (signal change) by more than k. Each state transition corresponding to a signal change in a signal sequence can then be associated with this probability measure. A low value of the measure indicates that the magnitude of the signal change is unlikely and therefore suggests an anomaly. Conversely, a higher value indicates that the signal change is very likely and therefore normal.

In this manner, the anomaly detection system 200 may be configured to implement one or more heuristic methods to evaluate state transitions corresponding to received message sequences.

Figure 4:
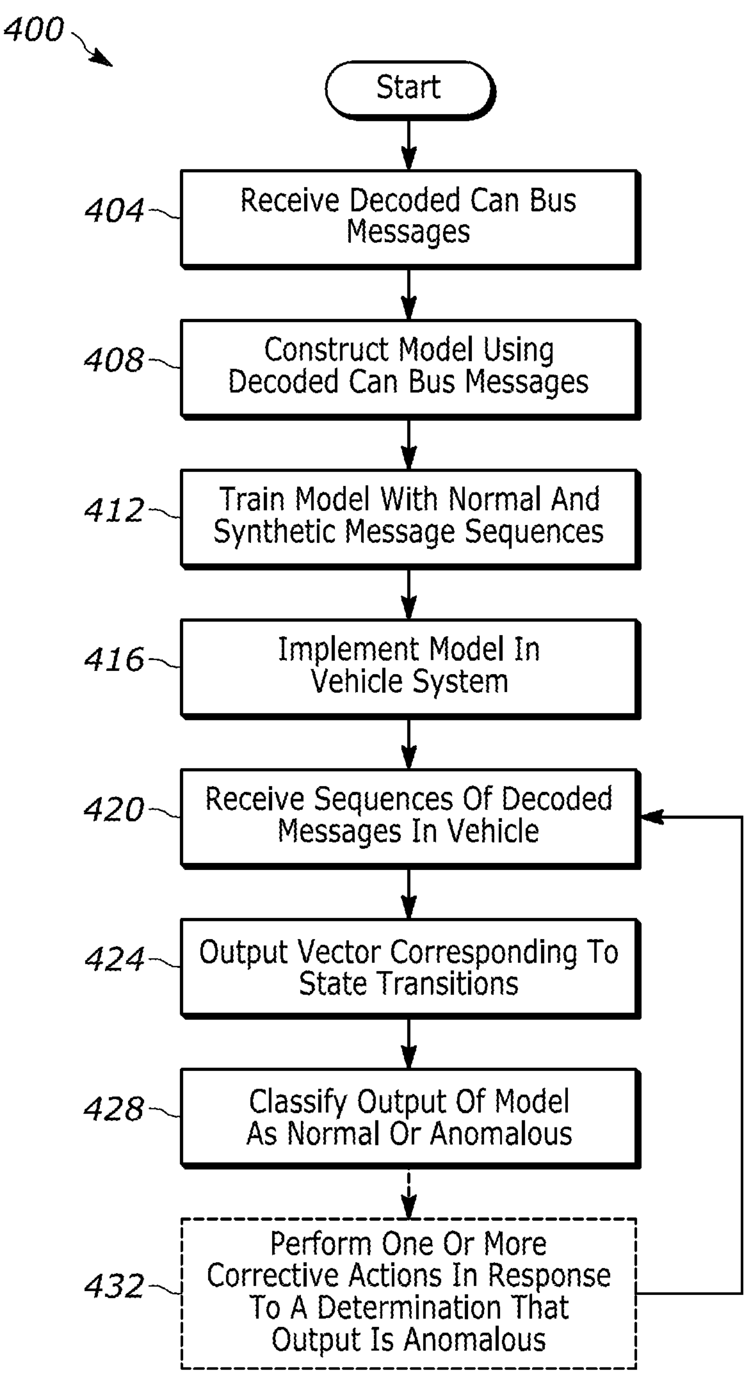
FIG. 4 illustrates steps of an example method for constructing and implementing a model of an anomaly detection system according to the present disclosure.

FIG. 4 illustrates steps of an example method 400 for constructing and implementing a model of an anomaly detection system according to the present disclosure. For example, the method 400 is implemented by one or more computing devices or systems and/or associated circuitry, such as the anomaly detection system 200, a computing device (e.g., the computing device 100) configured to implement the anomaly detection system 200, etc.

At 404, the method 400 (e.g., using a CAN bus logger, decoder, etc. as described above) receives decoded CAN bus messages associated with messages communicated between ECUs of a vehicle (e.g., training messages). For example, the CAN bus messages may be received from an IVN (i.e., from a diagnostic port of a vehicle), from a testing device, etc. At 408, a model (e.g., a signal-, graph-, and state space-based model, such as the model 212, 300, 340, etc.) is constructed using the received CAN bus messages. As described above, the model may be comprised of various observed signal states and observed transitions/edges between the signal states. Each node or state may include a sequence of one or more signal values for one or more signals (e.g., n different values of m different signals, where n and m are each integers having a value of 1 or greater).

At 412, the method 400 (e.g., the sequence generator 244) trains the model by supplying both normal and synthetic anomalous message sequences to the model. For example, the normal message sequences correspond to message sequences contained in the training messages. Conversely, the synthetic anomalous message sequences include message sequences that are not contained in the training messages but may still occur during operation as described above. In other words, the model is trained to recognize, as "normal," messages that were not included in the training messages but do not correspond to an intrusion or attack. The model may be tested and/or updated by continuing to supply synthetic anomalous message sequences to assess the accuracy of outputs of the model.

At 416, the trained model is implemented in a system, such as an IVN of a vehicle. At 420, the trained model receives sequences of decoded messages (e.g., an IVN message sequence). At 424, the model outputs a vector corresponding to a value assigned to a state transition between states of one or more signals. For example, the model calculates the vector using a distance heuristic method as described above. At 428, the method 400 classifies the output of the model as normal (e.g., outputs a "1") or anomalous (e.g., outputs a "0") based on the vector. At 432, the method 400 (e.g., the anomaly detection system 200, the IDS 208, etc.) optionally takes one or more corrective actions in response to a determination that a message sequence is anomalous. The corrective actions include, but are not limited to, disabling one or more vehicle systems or functions, alerting the driver, instructing the driver to pull over or turn off the vehicle, operating in a limited function mode, etc. Conversely, in response to a determination that a message sequence is normal, the method 400 proceeds to 420 to continue to monitor the decoded messages.

Figure 5:
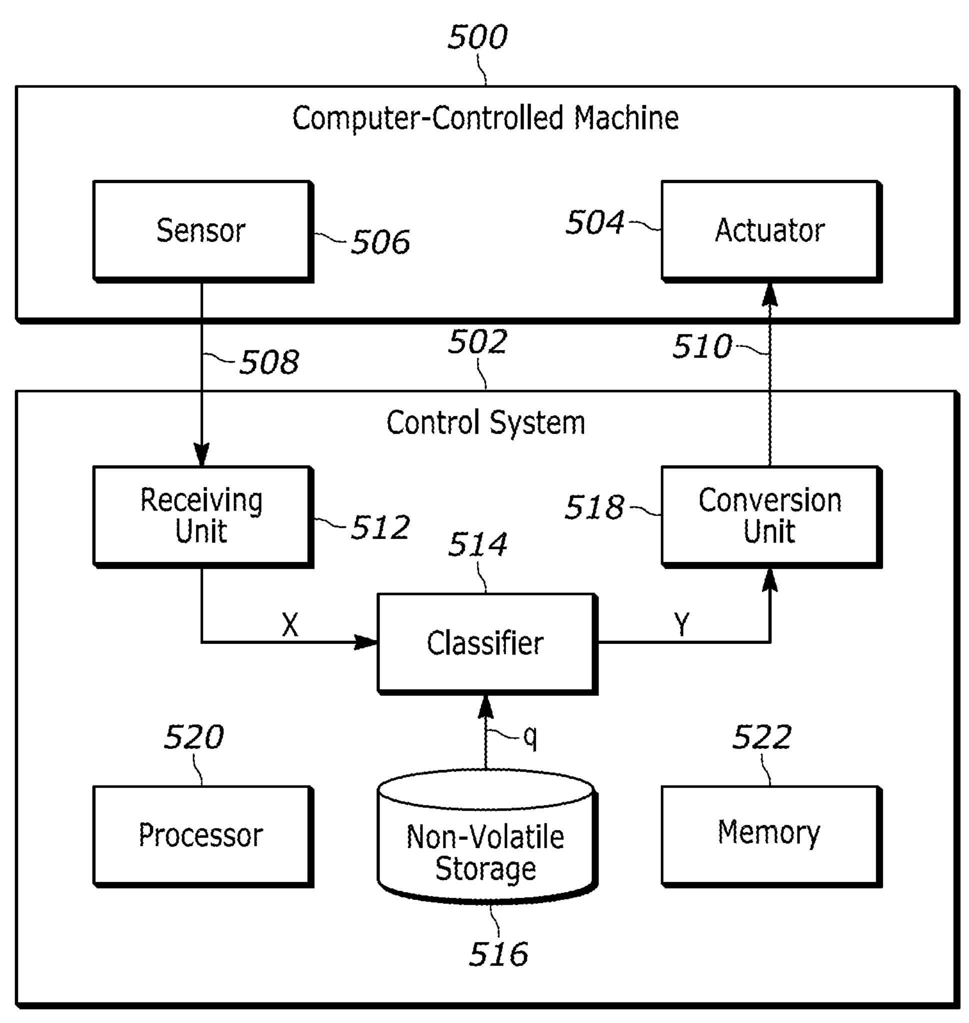
FIG. 5 depicts a schematic diagram of an interaction between a computer-controlled machine and a control system according to the principles of the present disclosure.

FIGS. 5-11 depict example systems and devices that may implement anomaly detection systems and methods according to the present disclosure. FIG. 5 depicts a schematic diagram of an interaction between a computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to produce each input signal x. Input signal x may include data corresponding to an image recorded by sensor 506.

Control system 502 includes classifier 514. Classifier 514 may be configured to classify input signals x into one or more labels using a machine-learning (ML) algorithm, such as a neural network. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more anomaly detection methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the anomaly detection methodologies as disclosed herein. Non-volatile storage 516 may also include data supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
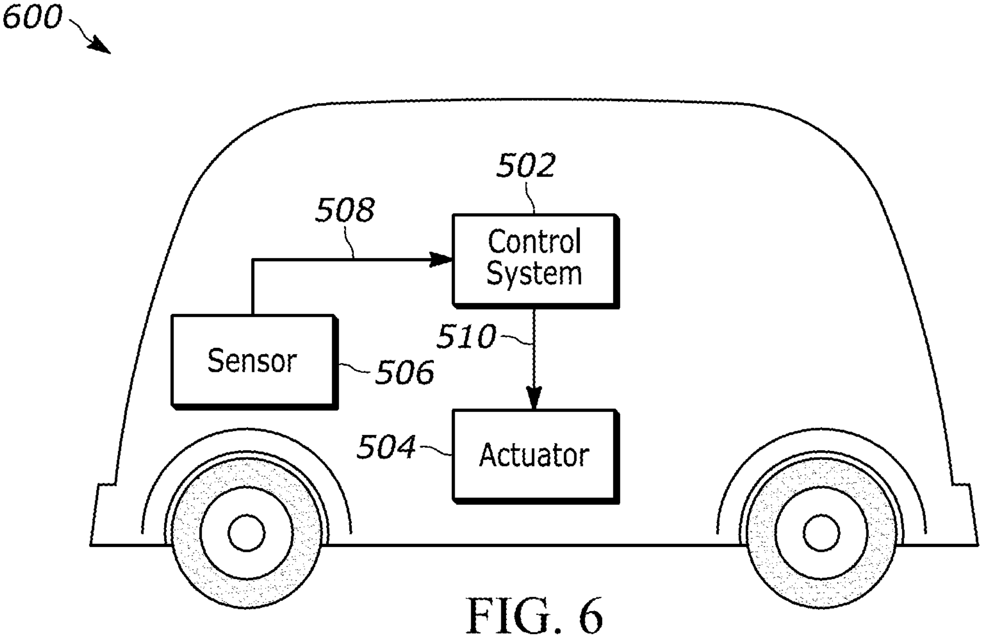
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
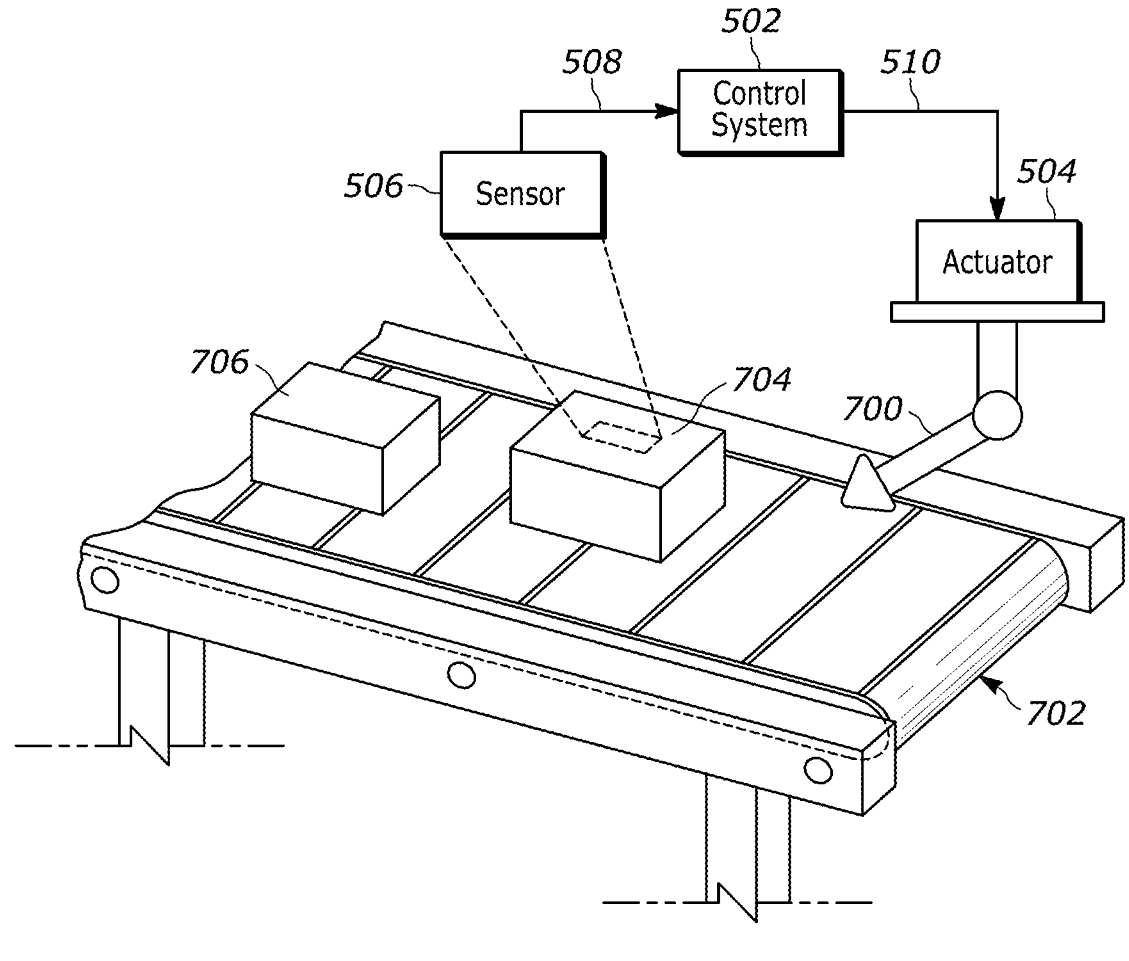
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
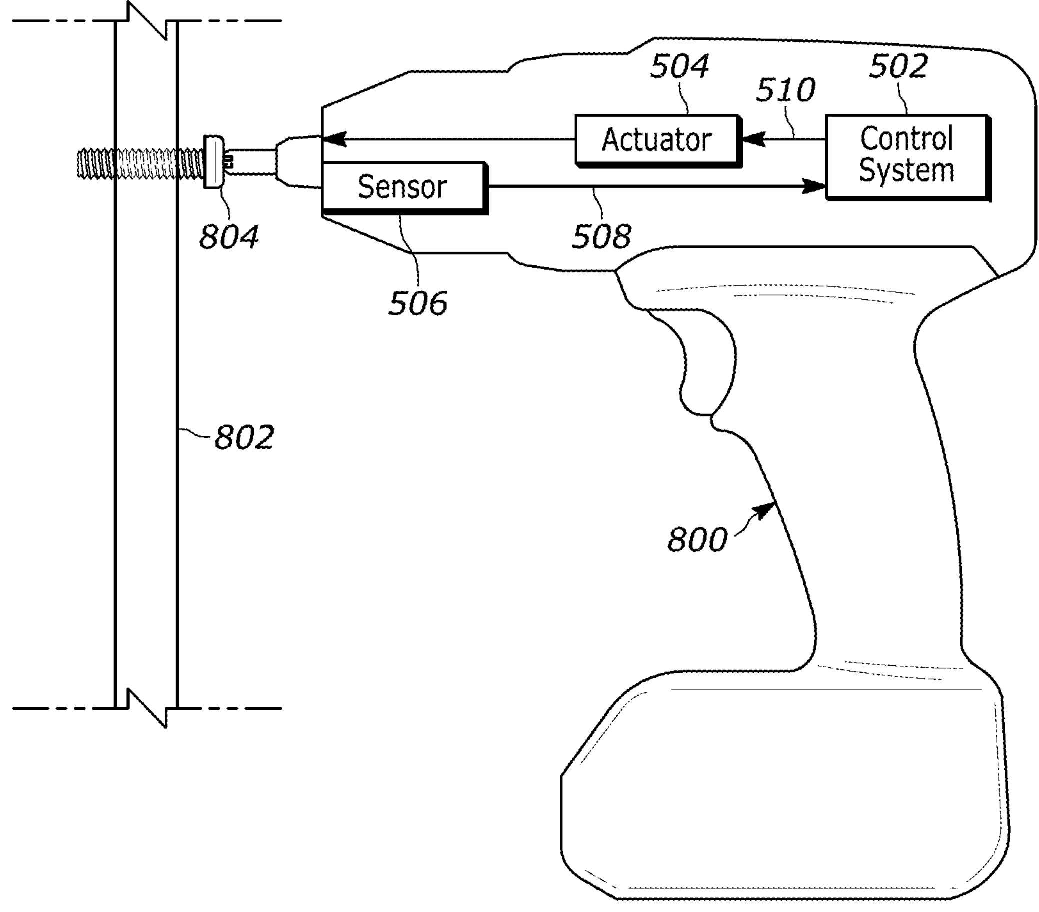
FIG. 8 depicts a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
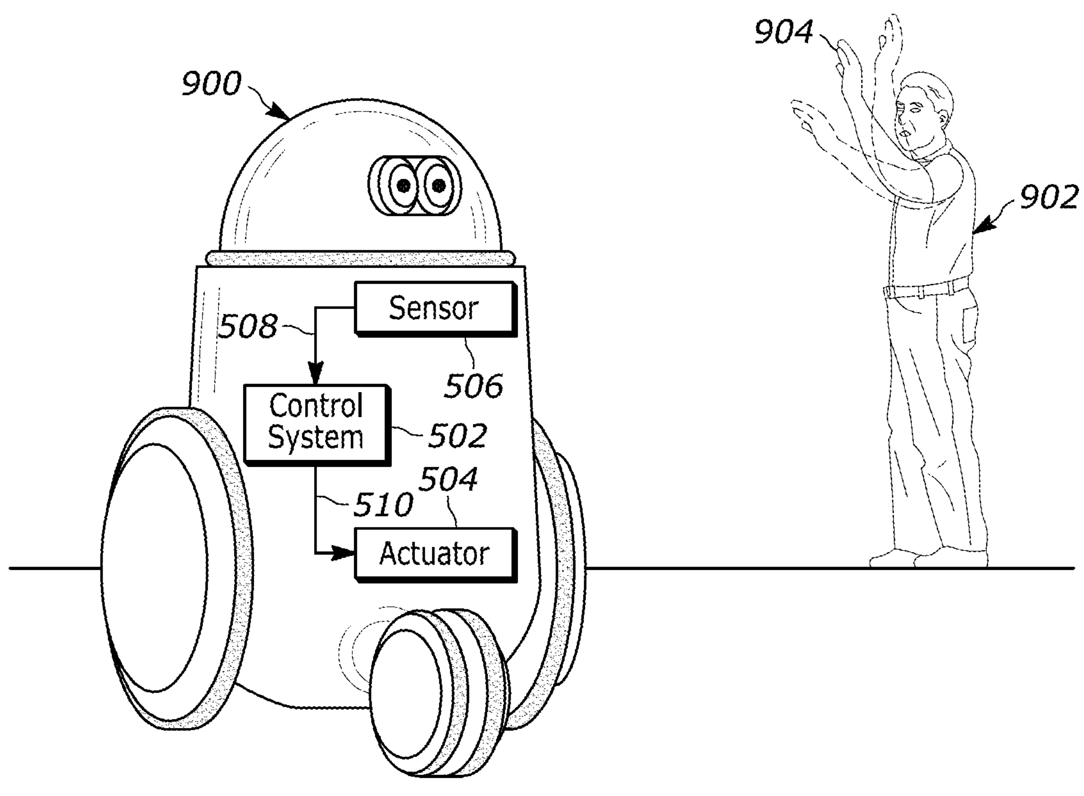
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
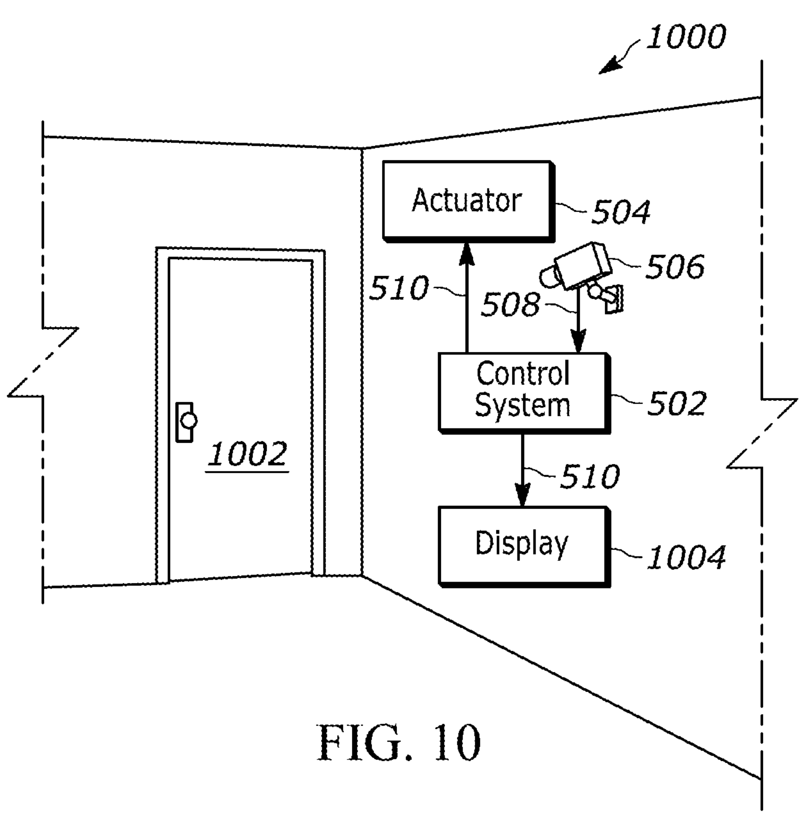
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
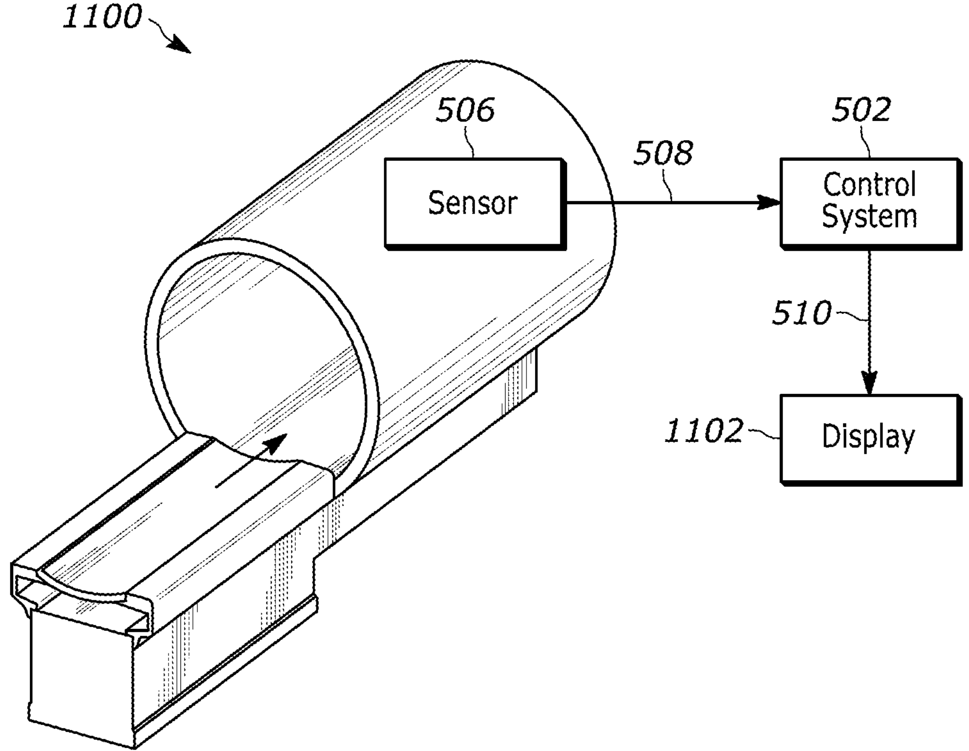
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of operating an anomaly detection system for a vehicle, the method comprising, using one or more processing devices:

receiving and decoding training message sequences corresponding to messages transmitted in an in-vehicle network (IVN) to obtain signal content of the messages;

constructing a model based on the signal content obtained from the decoded training message sequences, wherein the model includes a plurality of states corresponding to observed signal values of the signal content in the decoded training message sequences and state transitions between respective states of the plurality of states, wherein each of the plurality of states in the model encodes the observed signal values of the signal content of two or more correlated signals contained in the decoded training message sequences, and wherein each of the state transitions represents (i) a state transition, induced by observation of a signal in the IVN, to a next state of the plurality of states that encodes the observed signal values of the signal content of the two or more correlated signals, and (ii) a probability of the transition to the next state that encodes the observed signal values of the signal content of the two or more correlated signals;

training the model by supplying, to the model, (i) first message sequences corresponding to the decoded training message sequences and (ii) second message sequences not contained in the decoded training message sequences;

subsequent to training the model, executing the trained model to identify anomalous message sequences transmitted in the IVN by (i) receiving a decoded IVN message sequence, (ii) outputting, from the trained model, a value based on state transitions between states of signals contained in the decoded IVN message sequence, and (iii) outputting, based on the value, an indication of whether the decoded IVN message sequence includes an anomalous message sequence; and controlling one or more functions of the vehicle based on the indication.

2. The method of claim 1, wherein each of the plurality of states includes at least two values for each of the two or more correlated signals.

3. The method of claim 1, wherein outputting the value from the trained model comprises one of:

(i) calculating a distance between a first state of the plurality of states corresponding to a first message in the decoded IVN message sequence and a second state corresponding to a second message in the decoded IVN message sequence and calculating the value based on the distance; and (ii) calculating the value using a probability heuristic method.

4. The method of claim 3, wherein the distance corresponds to a number of state transitions in the model required to traverse between the first state and the second state.

5. The method of claim 4, wherein the second state does not correspond to any message contained in the decoded training message sequences.

6. An anomaly detection system for a vehicle, the anomaly detection system comprising:

model constructor circuitry configured to (i) receive decoded training message sequences corresponding to messages transmitted in an in-vehicle network (IVN), wherein the decoded training message sequences include signal content of the messages, and (ii) construct a model based on the decoded training message sequences, wherein the model includes a plurality of states corresponding to observed signal values of the signal content in the decoded training message sequences and state transitions between respective states of the plurality of states, wherein each of the plurality of states in the model encodes the observed signal values of the signal content of two or more correlated signals contained in the decoded training message sequences, and wherein each of the state transitions represents (i) a state transition, induced by observation of a signal in the IVN, to a next state of the plurality of states that encodes the observed signal values of the signal content of the two or more correlated signals, and (ii) a probability of the transition to the next state that encodes the observed signal values of the signal content of the two or more correlated signals;

sequence generator circuitry configured to train the model by supplying, to the model, (i) first messages sequences corresponding to the decoded training message sequences and (ii) second message sequences not contained in the decoded training message sequences;

model circuitry configured to execute the trained model to identify anomalous message sequences transmitted in the IVN by (i) receiving a decoded IVN message sequence and (ii) outputting, from the trained model, a value based on state transitions between states of signals contained in the decoded IVN message sequence;

model output classifier circuitry configured to output, based on the value, an indication of whether the decoded IVN message sequence includes an anomalous message sequence; and a controller configured to control one or more functions of the vehicle based on the indication.

7. The anomaly detection system of claim 6, further comprising a decoder configured to decode the training message sequences to obtain the decoded training message sequences.

8. The anomaly detection system of claim 6, wherein each of the plurality of states includes at least two values for each of the two or more correlated signals.

9. The anomaly detection system of claim 6, wherein the model circuitry is configured to implement the trained model to at least one of:

(i) calculate a distance between a first state of the plurality of states corresponding to a first message in the decoded IVN message sequence and a second state corresponding to a second message in the decoded IVN message sequence, and calculate the value based on the distance; and (ii) calculate the value using a probability heuristic method.

10. The anomaly detection system of claim 9, wherein the distance corresponds to a number of state transitions in the trained model required to traverse between the first state and the second state.

11. The anomaly detection system of claim 10, wherein the second state does not correspond to any message contained in the decoded training message sequences.

12. A computing device configured to implement an anomaly detection system for a vehicle, the computing device including a processing device configured to execute instructions stored in memory to cause the anomaly detection system to:

receive an in-vehicle network (IVN) message sequence corresponding to messages transmitted between electronic control units (ECUs) of the vehicle;

decode the IVN message sequence to obtain signal content of messages in the IVN message sequence;

provide the decoded IVN message sequence to a model, wherein the model includes a plurality of states corresponding to observed signal values of signal content in previous decoded IVN message sequences, wherein each of the plurality of states of includes signal values of the signal content of two or more correlated signals contained in the decoded IVN message sequence, and state transitions between respective states of the plurality of states, wherein each of the state transitions represents (i) a state transition, induced by observation of a signal in the IVN, to a next state of the plurality of states that encodes the observed signal values of the signal content of the two or more correlated signals, and (ii) a probability of the transition to the next state that encodes the observed signal values of the signal content of the two or more correlated signals;

output, from the model, a value based on state transitions between states of signals contained in the decoded IVN message sequence;

output, based on the value, an indication of whether the decoded IVN message sequence includes an anomalous message sequence; and control one or more functions of the vehicle based on the indication.

13. The computing device of claim 12, wherein each of the plurality of states includes at least two values for each of the two or more correlated signals.

14. The computing device of claim 12, wherein the processing device is further configured to execute instructions stored in memory to cause the anomaly detection system to at least one of:

(i) calculate a distance between a first state of the plurality of states corresponding to a first message in the decoded IVN message sequence and a second state corresponding to a second message in the decoded IVN message sequence, and calculate the value based on the distance, wherein the distance corresponds to a number of state transitions in the model required to traverse between the first state and the second state; and (ii) calculate the value using a probability heuristic method.

* * * * *